United States Patent
Okochi et al.

(10) Patent No.: US 8,009,827 B2
(45) Date of Patent: Aug. 30, 2011

(54) ENCRYPTION PROCESSING METHOD AND ENCRYPTION PROCESSING DEVICE

(75) Inventors: Toshio Okochi, Musashino (JP);
Takashi Endo, Musashimurayama (JP);
Takashi Watanabe, Kokubunji (JP);
Tatsuya Kameyama, Hachioji (JP);
Shunsuke Ota, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1147 days.

(21) Appl. No.: 11/653,879

(22) Filed: Jan. 17, 2007

(65) Prior Publication Data
US 2007/0195949 A1 Aug. 23, 2007

(30) Foreign Application Priority Data
Feb. 22, 2006 (JP) ................ 2006-045289

(51) Int. Cl.
*H04L 9/28* (2006.01)
(52) U.S. Cl. .......... 380/28; 380/37; 380/29; 380/277; 380/265; 713/168; 713/189; 713/170
(58) Field of Classification Search .......... 380/28
See application file for complete search history.

(56) References Cited

U.S. PATENT DOCUMENTS

| | | | |
|---|---|---|---|
| 5,740,249 A * | 4/1998 | Shimizu et al. | 380/28 |
| 5,949,884 A * | 9/1999 | Adams et al. | 380/29 |
| 5,961,578 A | 10/1999 | Nakada | |
| 6,031,911 A * | 2/2000 | Adams et al. | 380/29 |
| 6,182,216 B1 * | 1/2001 | Luyster | 713/168 |
| 6,327,654 B1 * | 12/2001 | Oowaki et al. | 713/167 |
| 6,606,385 B1 * | 8/2003 | Aikawa et al. | 380/28 |
| 7,454,017 B2 * | 11/2008 | Kaminaga et al. | 380/46 |
| 2004/0193898 A1 * | 9/2004 | Ochi et al. | 713/189 |
| 2005/0108498 A1 * | 5/2005 | Kaminaga et al. | 711/209 |
| 2005/0193187 A1 * | 9/2005 | Harada | 713/1 |
| 2006/0171532 A1 * | 8/2006 | Iketani et al. | 380/28 |

(Continued)

FOREIGN PATENT DOCUMENTS

| | | |
|---|---|---|
| JP | 10-21057 | 6/1996 |
| JP | 2001-268071 | 9/2001 |

OTHER PUBLICATIONS

"Specification for the Advanced Encryption Standard (AES)", Federal Information Processing Standards Publication 197, Nov. 26, 2001, pp. i-47.

(Continued)

*Primary Examiner* — Kambiz Zand
*Assistant Examiner* — Yonas Bayou
(74) *Attorney, Agent, or Firm* — Stites & Harbison PLLC; Juan Carlos A. Marquez, Esq.

(57) ABSTRACT

An increase in safety from attacks by use of hardware-like methods by small-sized hardware is achieved. An encryption processing device includes a logical circuit capable of programmably setting logics for executing cipher processing, a memory that stores plural pieces of logical configuration information corresponding to an identical cipher processing algorithm, and a CPU that selectively sets plural logics corresponding to an identical cipher processing algorithm in the logical circuit. Even in processing using an identical cipher key, by changing the logic of the logical circuit for each processing, power consumption in cipher processing can be varied, and places a timing in which malfunctions occur can be varied. Moreover, an increase in the scale of hardware for realizing plural logics can be curbed.

8 Claims, 6 Drawing Sheets

U.S. PATENT DOCUMENTS

2006/0242385 A1* 10/2006 Murakami et al. ............ 712/200
2007/0237327 A1* 10/2007 Taylor et al. .................... 380/37

OTHER PUBLICATIONS

Trichina, Elena, et al. "Simplified Adaptive Multiplicative Masking for AES", Cryptographic Design Center, Gemplus Technology R & D, Springer-Verlag Berlin Heidelberg, 2003, pp. 187-197.

Notification of Reasons for Refusal issued by the Japanese Patent Office on Apr. 7, 2011 in the corresponding Japanese Patent Application No. 2006-045289 (2 pages) with an English language translation (4 pages).

* cited by examiner $$b = Ma^{-1} \cdot v$$

$$M = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \quad v = \begin{bmatrix} 1 \\ 1 \\ 0 \\ 0 \\ 0 \\ 1 \\ 1 \\ 0 \end{bmatrix}$$

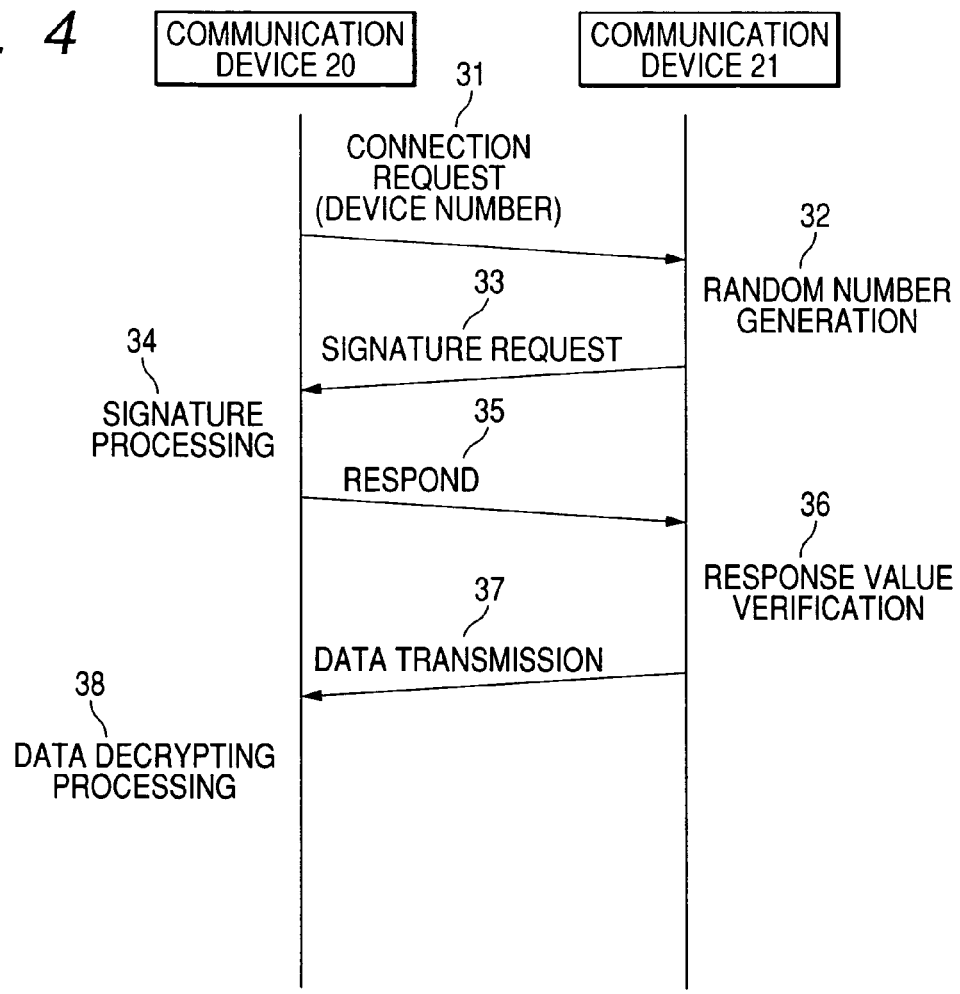
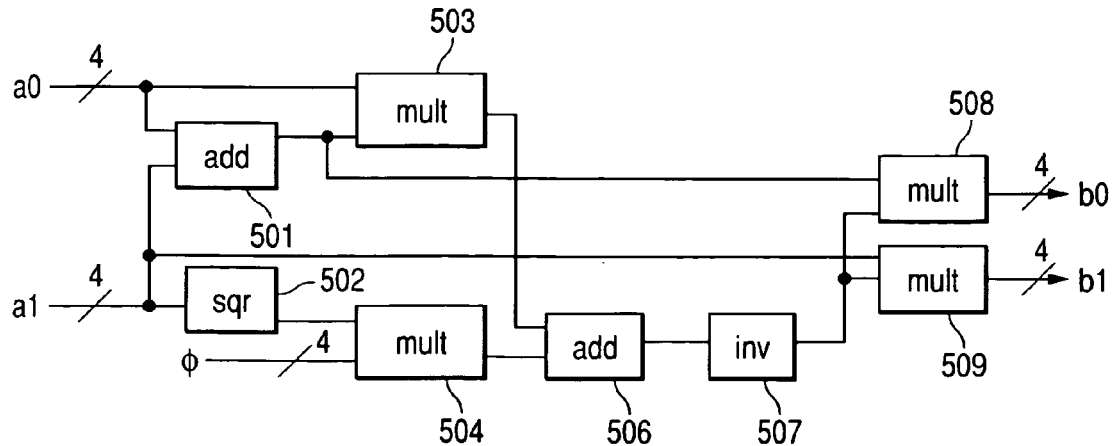

FIG. 11

| a | a⁻¹ |
|---|---|
| 00000000 | 00000000 |
| 00000001 | 00000001 |
| 00000010 | 00000011 |
| 00000011 | 00000010 |
|  |  |
|  |  |
| 11111111 | 11100000 |

ENCRYPTION PROCESSING METHOD AND ENCRYPTION PROCESSING DEVICE

CLAIM OF PRIORITY

The present application claims priority from Japanese application JP 2006-045289 filed on Feb. 22, 2006, the content of which is hereby incorporated by reference into this application.

FIELD OF THE INVENTION

The present invention relates to data encoding, and, more specifically, to cipher processing technology, and, for example, technology effectively applied to a communication device in a communication system.

BACKGROUND OF THE INVENTION

Public key cryptography technology is known as one of cipher technologies. In this technology, for example, as shown in FIG. 14 in JP-A No. 21057/1998, a sender forms cipher text C through encoding by "$C=M^e$ mod N" for a message M, and a receiver obtains the message M through decoding by "$M=C^d$ mod N" for the cipher text C. The parameters e and N in the encoding are publicized and d in the decoding is not publicized. The operational expressions for the encoding and the decoding are power remainder computations (modular exponentiation), and can be typically described as "$X^Y$ mod N" (X, Y, N are positive integers). "mod" denotes a remainder computation, and the power remainder computation "$X^Y$ mod N" means that a remainder produced by dividing $X^Y$ by N is a solution.

In AV (audio-visual) equipment having an IC card and copyright management function, and information equipment or communication devices having cipher processing functions such as a storage device, it is common to provide dedicated hardware to perform cipher processing with high performance and low power consumption. In such equipment, plural different cipher processings must be performed according to the use and object of application software, and an encryption system of digital contents, and a single device often includes plural pieces of cipher processing hardware.

As a method for achieving identical cipher processing with different logical configurations, with respect to AES (Advanced Encryption Standard) cipher described in Federal Information Processing Standards Publication 197, Announcing the ADVANCED ENCRYPT I/ON STANDARD (AES), Nov. 26, 2001, an implementation method described in Simplified Adaptive Multiplicative Masking for AES, Elena Trichina, Domenico De Seta, and Lucia Germani, LNCS 2523, p. 187-197 is known.

SUMMARY OF THE INVENTION

In AV (audio-visual) equipment having an IC, or "smart", card and copyright management function, and information equipment or communication devices having cipher processing functions such as a storage device, a cipher processing function including block cipher for data encryption and decryption and public key cryptography for authentication processing are required. Moreover, various cipher algorithms such as RSA, public key cryptography, such as elliptic curve cryptosystem, and DES and AES, and block cipher are widely used, and it is necessary to install these numerous algorithms as hardware functions.

In the above-described information equipment, safety (tamper-proof capability) from attacks by use of hardware-like methods is considered to be important. Specifically, it is required to secure safety from attacks of decrypting secret information by measuring power consumption and electromagnetic radiation during operation, and attacks of decrypting secret information by causing hardware in operation to malfunction and observing the results. It is conceivable to provide an additional logical circuit against attacks by use of the above-described hardware-like methods.

However, if the above-described information equipment, for each of the above-described various cipher algorithms, were to include additional logical circuits for achieving tamper-proof capability in addition to plural pieces of dedicated hardware, the hardware scale would increase, and an increase in manufacturing costs of information equipments could not be avoided.

Thus, the present invention is to provide technology for increasing safety from attacks by use of hardware-like methods using small-scale hardware.

The novel characteristics of the present invention will become apparent from the description of this specification and the accompanying drawings.

The inventions disclosed in the present application will be briefly described below.

(1) In a cipher processing method using a logical circuit capable of programmably setting logic for executing cipher processing, for each cipher processing, plural logic corresponding to an identical cipher processing algorithm is selectively set in the logical circuit.

According to the above-described means of (1), in a cipher processing method, plural logic corresponding to an identical cipher processing algorithm is selectively set in the logical circuit. Even in processing that uses an identical cipher key, changing the logic of the logical circuit can cause current consumption in the cipher processing to vary, so that safety from attacks by current analysis can be increased. By changing the logic of the logical circuit, places and timing in which malfunction occurs can be varied, so that safety from attacks by malfunction analysis can be increased. Since plural logic corresponding to an identical cipher processing algorithm is selectively set in the logical circuit, an increase in the scale of hardware for realizing plural logic can be curbed. This achieves an increase in safety from attacks by use of hardware-like methods by small-scale hardware.

(2) In the above-described (1), before cipher processing is performed in the above-described logical circuit, plural logic corresponding to an identical cipher processing algorithm can be selectively set in the logical circuit, based on a cipher processing procedure in the logical circuit, execution timing of the cipher processing in the logical circuit, or plural pieces of logical configuration information regarding power consumptions involved in the cipher processing.

(3) An encryption processing device can be constructed with a logical circuit capable of programmably setting a logic for executing cipher processing, and a CPU may selectively set plural logic corresponding to an identical cipher processing algorithm in the above-described logical circuit.

(4) An encryption processing device can be constructed with a logical circuit capable of programmably setting a logic for executing cipher processing, a memory that stores plural pieces of logical configuration information corresponding to an identical cipher processing algorithm, and a CPU that selectively sets plural logic corresponding to an identical cipher processing algorithm in the above-described logical circuit, based on the logical configuration information of the memory.

According to the above-described means of (3) and (4), in the encryption processing device, even in processing using an identical cipher key, by changing the logic of the logical circuit, current consumption in cipher processing can be varied, so that safety from attacks by current analysis can be increased. By changing the logic of the logical circuit, places and timing in which malfunction occurs can be varied, so that safety from attacks by malfunction analysis can be increased. Since plural logic corresponding to an identical cipher processing algorithm is selectively set in the logical circuit, an increase in the scale of hardware for realizing plural logics can be curbed. This achieves an increase in safety from attacks by use of hardware-like methods by small-scale hardware.

(5) In the above-described (4), immediately before cipher processing is performed in the above-described logical circuit, the CPU can be constructed to selectively set plural logic corresponding to an identical cipher processing algorithm in the logical circuit, based on the logical configuration information of the memory. By this construction, the logical circuit can be readily used in time division mode and can be more efficient.

(6) In the above-described (4), immediately before cipher processing is performed in the above-described logical circuit, plural logic corresponding to an identical cipher processing algorithm can be selectively set in the logical circuit, based on a cipher processing procedure in the logical circuit, execution timing of the cipher processing in the logical circuit, or plural pieces of logical configuration information that power consumptions involved in the cipher processing in the logical circuit are mutually different. By this construction, the logical circuit can be readily used in time division mode and can be more efficiently used.

(7) In the above-described (4), the above-described plural pieces of logical configuration information can include configuration information obtained by arithmetic processing of the CPU.

(8) In the above-described (4), from the viewpoint of security, preferably, the above-described plural pieces of logical configuration information are encrypted before being stored in the memory, (9) In the above-described (4), to prevent loss of the above-described logical configuration information, the above-described memory can be a nonvolatile memory.

(10) In the above-described (4), the above-described logical circuit can be easily constituted by FPGA (Field Programmable Gate Array) or PLD (Programmable Logic Device).

Effects obtained by typical disclosures of the invention will be described in brief as follows.

An increase in safety from attacks by use of hardware-like methods by small-scale and small size hardware can be achieved.

BRIEF DESCRIPTION OF THE DRAWINGS

FIG. 4 is a drawing for explaining a procedure when a communication device included in a communication system shown in FIG. 3 receives encrypted information;

FIG. 5 is a drawing for explaining a logical configuration example realized based on logical configuration information in a reconfigurable logical circuit included in the encryption processing device;

FIG. 11 is a drawing for explaining an inverse calculation correspondence table usable in the encryption processing device.

DETAILED DESCRIPTION OF THE PREFERRED EMBODIMENTS

Figures 2, 3:
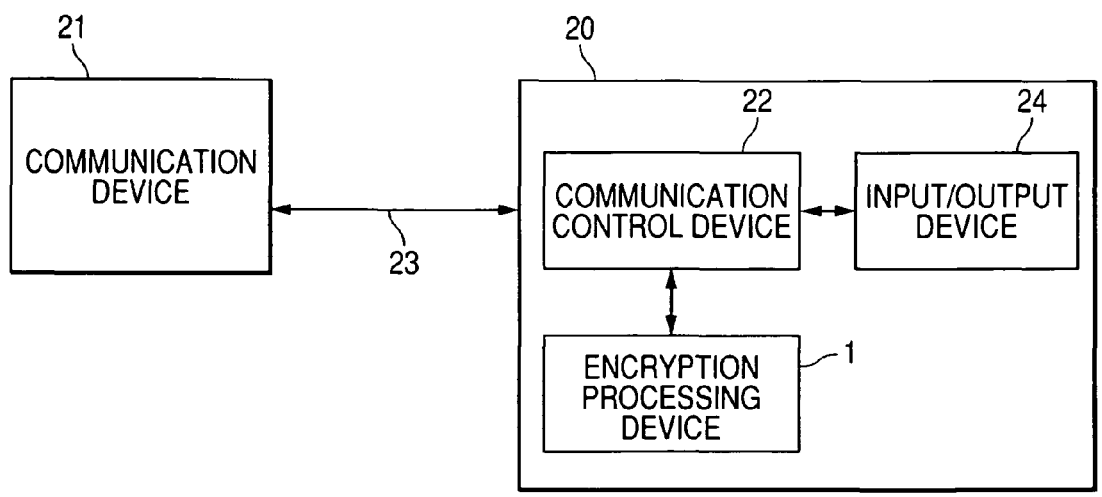
FIG. 2 is a drawing for explaining Sbox definition, which is a part of the algorithm of AES handled in the encryption processing device.
FIG. 3 is a block diagram showing a communication system including the encryption processing device.

FIG. 3 shows a communication system including an encryption processing device according to the present invention.

In a communication system shown in FIG. 3, although there is no particular limitation, a first communication device 20 and a second communication device 21 are coupled via a communication line 23 to exchange various signals between the first communication device 20 and the second communication device 21. The first communication device 20 and the second communication device 21 may have the same configuration. The first communication device 20, although there is no particular limitation, includes a communication control device 22 that performs communication control, an input-output device 23 that enables input/output of signal via the communication control device 22, and an encryption processing device 1 that performs encryption processing of communication performed by the communication control device 22. Although there is no particular limitation, the encryption processing device 1 has plural types of encryption processing functions including data encryption, block cipher for decryption, public key cryptography for authentication processing, and the like.

One of commands sent via the I/O interface 5 is an electronic signature processing command. For a method of electronic signature, a well-known technology described in Alfred J. Menezes, Paul C. van Oorschot, Scott A. Vanstone "Handbook of Applied Cryptography", CRC Press, 1996, ISBN: 0-8493-8523-7, chapter 7 can be applied. The electronic signature processing can be used by the communication device to perform individual identification and authentication of communication party. The device sends a random number value via a communication path, and the encryption processing device performs signature for the random number by using a specific secret key stored in advance. This processing is used by the device of the communication party to perform individual identification of the encryption processing device 1. Details of the algorithm of electronic signature processing are given in, for example, Alfred J. Menezes, Paul C. van Oorschot, Scott A. Vanstone "Handbook of Applied Cryptography", CRC Press, 1996, ISBN: 0-8493-8523-7, chapter 7.

FIG. 4 shows a processing procedure when the communication device 20 receives encrypted information from another communication device 21.

When the communication device 20 performs communication with the communication device 21, it transmits a connection request 31. The communication request 31 includes the device number of the communication device 20. On receiving the connection request 31, the communication device 21 generates a random number (32), transmits the random number to the communication device 20 that requests the connection, and requests a signature (23). The communication device 20 performs signature processing by using its own secret key (34), and sends back the signature to the communication device 21 (35). The communication device 21 verifies the signature by using a public key to the secret key of the communication device 20. When the verification succeeds, the communication device 21 determines that the communication device 20 is valid, and transmits data (37). The communication device 20 decrypts the data transmitted from the communication device 21 (38).

In the above-described example, the authentication of a communication device is performed by electronic signature. However, the present invention is not limited to this, and individual authentication by use of zero knowledge proof, individual authentication by use of common key cipher, and the like can be used. Algorithms of various authentication processings are described in, for example, Alfred J. Menezes, Paul C. van Oorschot, Scott A. Vanstone "Handbook of Applied Cryptography", CRC Press, 1996, ISBN: 0-8493-8523-7, chapter 10.

Figure 1:
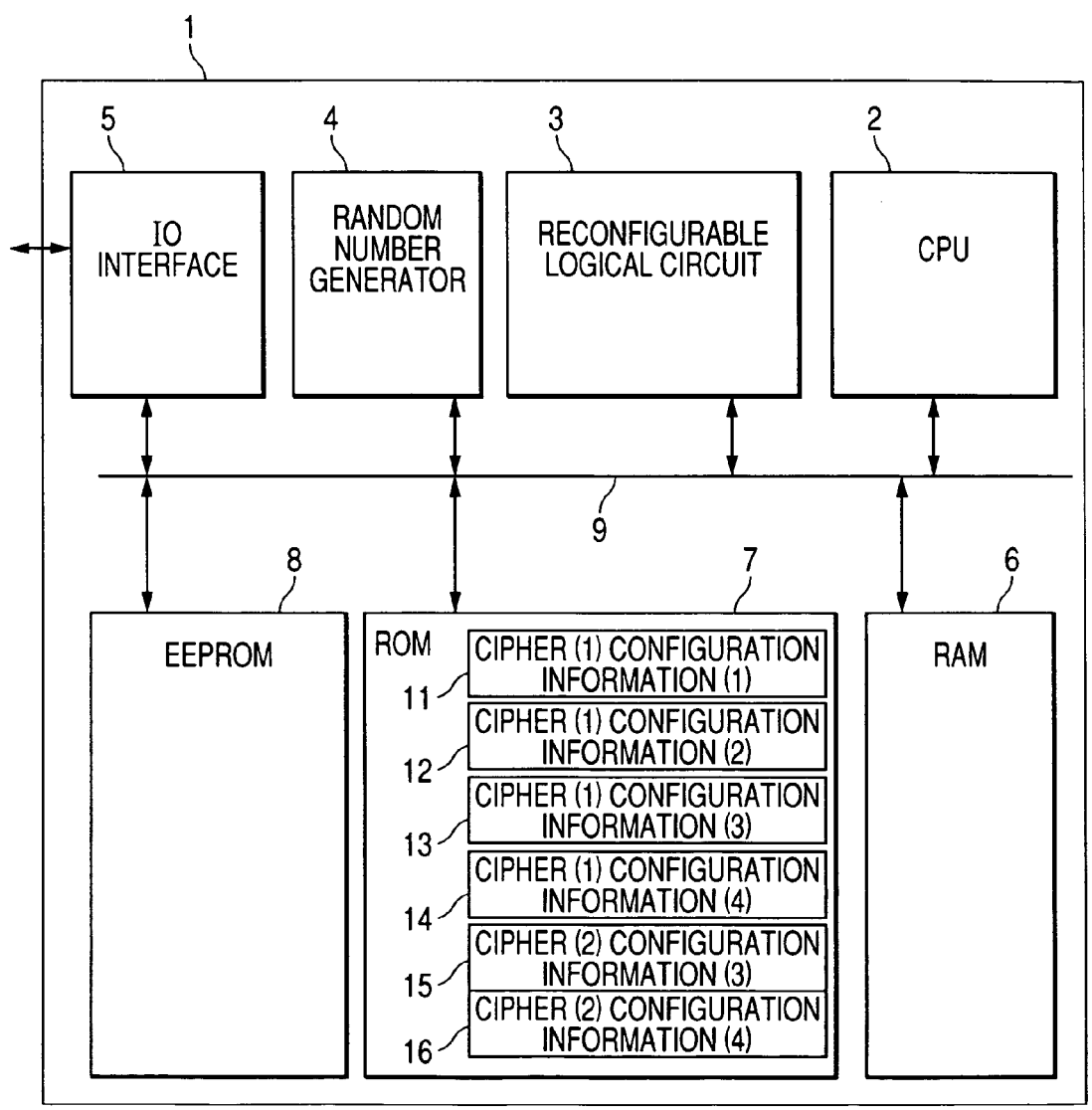
FIG. 1 is a block diagram showing an encryption processing device according to the present invention.

FIG. 1 shows an example of the configuration of the encryption processing device 1.

The encryption processing device 1 shown in FIG. 1, although there is no particular limitation, is formed on one semiconductor substrate such as a monocrystalline silicon substrate by a well-known semiconductor integrated circuit manufacturing technology.

The encryption processing device 1 shown in FIG. 1, although there is no particular limitation, includes a CPU 2 (central processing unit) for arithmetic processing, a reconfigurable logic circuit 3 whose logical configuration can be changed, a random number generator 4 for generating random number, an I/O (input/output) interface 5 that enables input/output of various signals with the outside, a RAM (random access memory) 6 used for a work area in arithmetic processing in the CPU 2, ROM (read only memory) 7 in which various information is stored, and EEPROM (electrically erasable programmable read only memory) 8 capable of rewriting stored information. They are connected with each other by a system bus 9.

The encryption processing device 1 receives commands according to communication through the I/O interface 5, executes predetermined processing, transmits a reply via the I/O interface 5, and if necessary, records results in the RAM 6 and the EEPROM 8.

The reconfigurable logic circuit 3, although there is no particular limitation, comprises a logical circuit called FPGA (Field Programmable Gate Array) or PLD (Programmable Logic Device). An example of the internal configuration of FPGA is described in, for example, Stratix II Device Handbook, Volume 1 ver 3.1, July 2005. The above-described reconfigurable logic circuit 3 is an example of a logical circuit in the present invention.

The ROM 7 stores a program executed by the CPU 2, and logical configuration information 11 to 16 for setting a logical configuration in the reconfigurable logical circuit 3 by the CPU 2. This logical configuration information 11 to 16 includes plural configuration information for executing identical cipher processing by different processing procedures. Although there is no particular limitation, the logical configuration information 11 to 14 are set to mutually different configuration information (1) to (4) correspondingly to identical cipher (1), and logical configuration information 15 and 16 are set to mutually different configuration information (3) to (4) correspondingly to identical cipher (2). As a result, when the logic of the reconfigurable logical circuit 3 is set by using the logical configuration information 11 to 14, although identical cipher (1) processing is performed, a logical configuration of the reconfigurable logical circuit 3 is different depending on the logical configuration information 11 to 14. Likewise, when the logic of the reconfigurable logical circuit 3 is set by using logical configuration information 15 and 16, although identical encryption (2) processing is performed, a logical configuration of reconfigurable logical circuit 3 is different depending on to the logical configuration information 15 and 16. Since the logical configurations of the reconfigurable logical circuit 3 are different, the procedures of cipher processing are different, and power consumption and electromagnetic radiation are different during operation of the reconfigurable logical circuit 3. Accordingly, identical cipher processing is performed with different logical configurations of the reconfigurable logical circuit 3, and it becomes difficult to decrypt secret information, based on the measurement of power consumption and electromagnetic radiation during operation. By changing the logic of the reconfigurable logical circuit 3, places and timings in which malfunction occurs can be varied. As a result, it becomes difficult to decrypt secret information based on malfunction analysis. By this construction, tamper-resistant capability can be increased.

The above-described logical configuration information 11-14 can be stored in the ROM 7 after being encrypted for security. The above-described logical configuration information 11 to 14 are decrypted by the CPU 2.

The following describes a method of realizing identical cipher processing with different logical configurations, by using an example of AES (Advanced Encryption Standard), which is one of standard block ciphers.

Details of processing mode of AES are given in, for example, Federal Information Processing Standards Publication 197, Announcing the ADVANCED ENCRYPTION STANDARD (AES), Nov. 26, 2001. The following describes implementation of processing called Sbox, which is a part of the algorithm of AES. Sbox of AES is the conversion of eight-bit data, and is defined by an expression shown in FIG. 2 by a combination of multiplicative inverse calculation in Galois field GF ($2^8$) of characteristic 2 and affine transformation. This transformation constitutes one-to-one mapping of sets of an order 256.

When this computational expression is implemented by a logical circuit, in a multiplicative inverse calculation of input value a, Simplified Adaptive Multiplicative Masking for AES, Elena Trichina, Domenico De Seta, and Lucia Germani, LNCS 2523, p. 187-197 describes that the value of a is estimated from the relationship between the value of a and power consumption, and part of cipher key can be decrypted using it. As a method of preventing this decryption, in inverse calculation of a, the input value is subjected to transformation in advance, and after inverse calculation is performed, the influence by the transformation of the input value is eliminated to eliminate data dependency of current values. This method is also described in the same document. Specifically, this can be realized by a method represented by a computational expression below.

When $a'=a+d$ and $(a^{-1})'=a^{-1}+d$, $(a^{-1})'$ can be calculated as described below by using a random number y.

$$((a'\times y+dy)^{-1}+(d\times y^{-1}))\times y=((a\times y)^{-1}+(d\times y^{-1}))\times y= ((a^{-1}+d)\times y^{-1})\times y=a^{-1}+d$$

In the above-described calculation method, two parameters d and y are used at execution time. d is an optional element of Galois field $GF(2^8)$, y is an optional value other than zero of $GF(2^8)$, and they are referred to as "mask items."

In an AES processing method of the this example, for plural sets of the above-described two parameters, configuration information for configuring a reconfigurable logical circuit is stored in the ROM 7 to execute a computational expression obtained with the parameters fixed. During AES cipher processing execution, the CPU 2 selects one piece of configuration information from the plural pieces of configuration information to configure a reconfigurable logical circuit 3, and executes AES cipher processing.

The following describes an example of logical configuration achieved based on logical configuration information 11 to 16 in the reconfigurable logical circuit 3.

FIG. 5 shows an example of configuration for obtaining four-bit outputs b0 and b1 by performing an inverse calculation of $GF(2^8)$, based on four-bit inputs a0, a1, and φ.

A circuit shown in FIG. 5 comprises adding circuits (add) 501 and 506, multiplying circuit (mult) 503, 504, 508, and 509, square circuit (sqr) 502, and an inverter (inv) 507. The adding circuits (add) 501 and 506 obtain an exclusive OR of individual bits. Output of the adding circuit 501 is transmitted to the multiplying circuits 503 and 508. Output of the adder 506 is transmitted to an inverter (inv) 507 of a subsequent stage. The inverter (inv) 507 inverts the output logic of the adding circuit 506 for output to the multiplying circuits 508 and 509 of a subsequent stage. The multiplying circuits (mult) 503, 504, 508, and 509 make multiplication of $GF(2^4)$. The square circuit (sqr) 502 calculates the original square of $GF(2^4)$.

Figure 6:
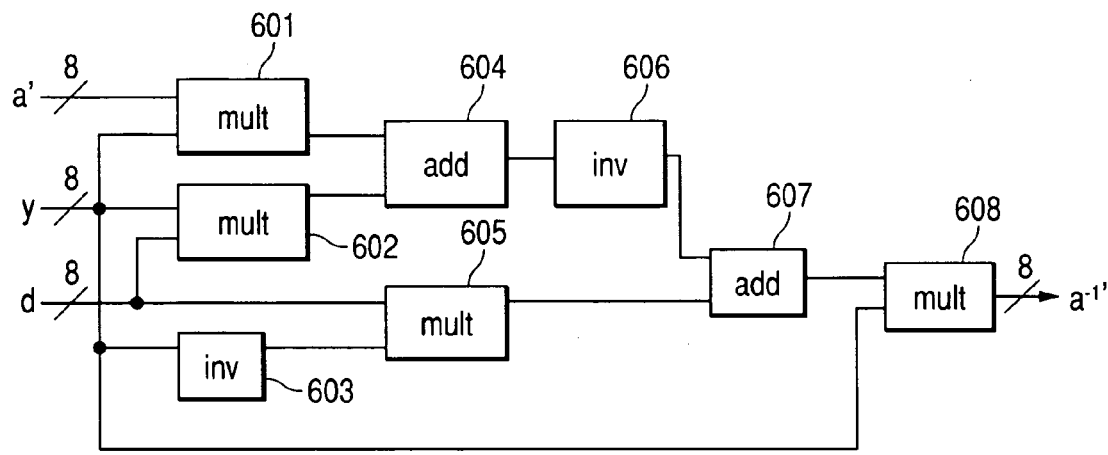
FIG. 6 is another drawing for explaining a logical configuration example realized based on logical configuration information in a reconfigurable logical circuit included in the encryption processing device.

FIG. 6 shows an example of a logical configuration for implementing an inverse calculation into which the above-described mask items are introduced.

The configuration example shown in FIG. 6 includes adding circuits (add) 604 and 607, multiplying circuits (mult) 601, 602, 605, and 608, and inverters (inv) 603 and 606. Inputs a', y, and d and output $a^{-1}$ respectively consist of eight bits. At this time, when mask items (d, y) are fixed to specific values, this circuit is realized by simpler logical circuits. Specifically, the multiplying circuits 601, 602, and 605 that input the mask values (d, y) are simplified. When the value of input value y is fixed, the inverse calculation circuit 603 that calculates an inverse element of y can be deleted by being replaced by a set of signal lines fixed to the values of inverse elements previously calculated. The description below, for convenience, shows how the multiplying circuit of the Galois field is simplified, using an example of the case of GF(4). Although the multiplying circuit of GF(16) is used in the inverse calculation circuit of GF(256) shown in FIG. 5, the principle of logic simplification is the same.

Figure 7:
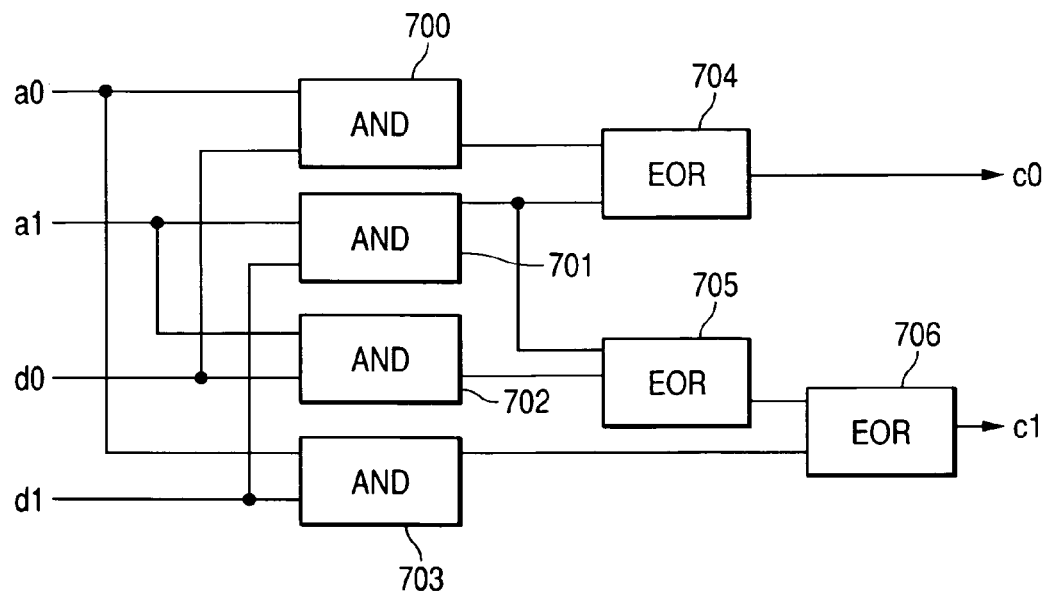
FIG. 7 is another drawing for explaining a logical configuration example realized based on logical configuration information in a reconfigurable logical circuit included in the encryption processing device.

FIG. 7 shows an example of the logical configuration of the multiplying circuit of GF(4).

In FIG. 7, the multiplying circuits 700 to 703 input two input values a and d, and a multiplication result c is outputted via exclusive ORs (EOR) 704, 705, and 706. An element of GF(4) is represented by (0,0), (0,1), (1,0), and (1,1) as two-bit data. (0,0) represent a zero element, and (0,1) represents a unit element. Input values of the multiplying circuit are a=(a1,a0) and d=(d1,d0), and output is c=(c1,c0).

Hereinafter, when part of input values of the above-described multiplying circuit is established, a logical circuit can be simplified as shown below.

Figure 8:
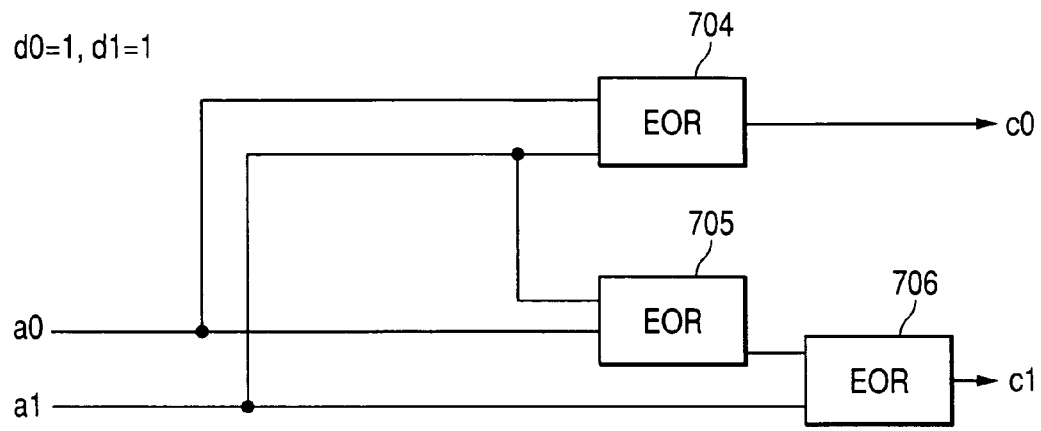
FIG. 8 is another drawing for explaining a logical configuration example realized based on logical configuration information in a reconfigurable logical circuit included in the encryption processing device.
Figure 9:
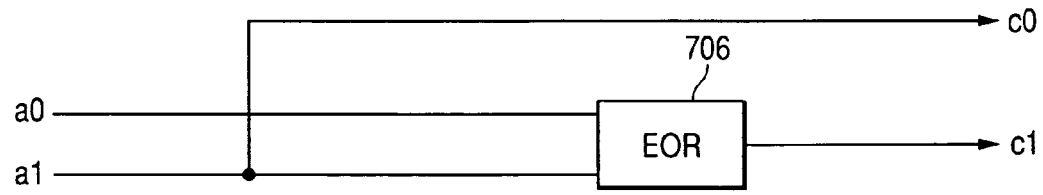
FIG. 9 is another drawing for explaining a logical configuration example realized based on logical configuration information in a reconfigurable logical circuit included in the encryption processing device.
Figure 10:
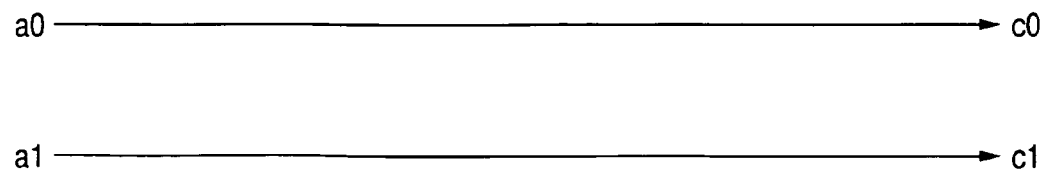
FIG. 10 is another drawing for explaining a logical configuration example realized based on logical configuration information in a reconfigurable logical circuit included in the encryption processing device.

FIGS. 8, 9, and 10 show configuration examples when d of input values of the multiplying circuit of FIG. 7 are d=(1,1), d=(1,0), d=(0,1), respectively. When d=(0 μl), d is a multiplication unit element in GF(4), and multiplication with d is identity mapping. As shown by these examples, when part of input values are established, a logical configuration of an inverse calculation circuit is significantly simplified.

Another method of realizing an inverse calculation is to use a table. For example, a correspondence table of inverse calculations of $GF(2^8)$ as shown in FIG. 1 as a table in the RAM 6, ROM 7, or EEPROM 8, and during execution of cipher processing, an inverse to an input value may be obtained by consulting the above-described tables.

In another configuration example of an encryption device of the present invention, in a masked inverse calculation circuit shown in FIG. 6, for plural circuits simplified with mask values y and d fixed, configuration information of reconfigurable logical circuits is stored in the ROM 7 or EEPROM 8, and during execution of cipher processing, the configuration information is selected in a predetermined procedure. This construction, in comparison with when the multiplying circuit shown in FIG. 6, is realized without changes on the reconfigurable logical circuit 3, and thus the encryption device can be realized with a smaller amount of hardware. Since the fluctuation of signal lines during execution occurs less frequently than that during execution with the circuit shown in FIG. 6, run-time power consumption can be reduced.

Furthermore, configuration information for implementing a correspondence table of inverse calculations as shown in FIG. 11 in the reconfigurable logical circuit 3 as stored in the ROM 7, and during execution of cipher processing, the above-described correspondence table may be referred to. In this case, an inverse calculation result can be obtained in a short time.

In the above-described example, in the masked inverse calculation circuit, configuration information of circuits with mask values fixed is stored. However, as another embodiment, such configuration information may be created by the CPU 2 during execution. In this case, configuration information about the masked inverse calculation circuit shown in FIG. 6 may be stored in the ROM 7 to obtain simplified configuration information with mask values fixed by the CPU 2. In other words, during cipher processing execution, the CPU 2 selects mask values used for a masked inverse calculation according to a predetermined procedure, the CPU 2 creates configuration information of simplified logical circuits with the input values of masked inverse calculation circuits fixed to the mask values, and performs cipher processing by forming a logic in the reconfigurable logical circuit 3 by using the configuration information. At this time, the configuration information obtained in the CPU 2 is temporarily stored in the RAM 6.

Effects described below can be obtained according to the above-described example.

(1) Each time cipher processing is performed, plural logic corresponding to an identical cipher processing algorithm is selectively set in the reconfigurable logical circuit 3 by the CPU 2. A change in the logic of the reconfigurable logical circuit 3 can cause current consumption in the cipher processing to vary even in processing using an identical cipher key, so that safety from attacks based on current analysis can be increased. Moreover, a change in the logic of the reconfigurable logical circuit 3 can cause places and timing of malfunctions to vary, so that safety from malfunction analysis attacks can be increased.

(2) Since plural logic corresponding to an identical cipher processing algorithm is selectively set in the reconfigurable logical circuit 3, an increase in the scale of hardware for realizing plural logics can be curbed.

(3) Because of the above-described effects of (1) and (2), an increase in safety from attacks by use of a hardware technique by a small-scale and/or sized hardware can be achieved.

(4) Since plural logic corresponding to mutually different cipher processing algorithms are selectively set in the reconfigurable logical circuit 3, an increase in the scale of hardware for realizing plural logic can be curbed. In AV (audio-visual) equipment having an IC card and copyright management function, and information equipment or communication devices having cipher processing functions such as a storage device, plural different cipher processings must be performed according to the use and object of application software, and an encryption system of digital contents, and a single device often includes plural pieces of cipher processing hardware. However, the plural pieces of cipher processing hardware are often selectively used, and are seldom used at the same time. Therefore, as described above, even if plural logic corresponding to mutually different cipher processing algorithms is selectively set in the reconfigurable logical circuit 3, no special inconvenience occurs in cipher processing.

(4) Because of the above-described effects of (3) and (4), an improvement in the reliability of the communication system shown in FIG. 3 and reduction in system costs can be achieved.

Hereinbefore, although the invention made by the inventors of the present invention has been described in detail based on the preferred embodiment, it goes without saying that the present invention is not limited to the preferred embodiment, but may be modified in various ways without changing the main purpose of the present invention.

For example, the logical configuration information 11 to 16 may be stored in the EEPROM 8. Since the EEPROM 8 can be electrically written, when the logical configuration information 11 to 16 are stored in the EEPROM 8, the logical configuration information 11 to 16 can be easily changed by rewriting the stored information.

The above description has been primarily made on the case in which the invention made by the present inventors is applied to a cipher processing device included in a communication system, which is an application field of the invention. However, the present invention is not limited to the embodiment, and can be widely applied to devices that perform cipher processing.

The present invention can be applied on the condition that a programmably settable logical circuit includes at least a logic for executing cipher processing.

What is claimed is:

1. An encryption processing device comprising:
a logical circuit capable of programmably setting to a plurality of logics for executing cipher processing;
a memory that stores a plurality of logical configurations each corresponding to a respective plurality of logics, the logical configurations each corresponding to identical cipher processing; and
a CPU that manages a selective setting of the logical circuit to one plurality of logics for performance of the identical cipher processing based on the logical configuration of the plurality of logical configurations in the memory that corresponds to the one plurality of logics, and
wherein the plurality of logical configurations include a plurality of mask parameters that are used during execution of the identical cipher processing, and
wherein the CPU performs arithmetic processing to create configuration information for setting of the logical circuit from the logical configuration that corresponds to the one plurality of logics with fixed values for the plurality of mask parameters.

2. The encryption processing device according to claim 1, wherein, before the cipher processing is performed, the CPU selectively sets the plurality of logics based on one logical configuration that is algorithmically identical to a previous one of the logical configurations based upon which the plurality of logics was set.

3. The encryption processing device according to claim 1, wherein, before the cipher processing is performed in the logical circuit, the CPU selectively sets the plurality of logics based on at least one of a cipher processing procedure in the logical circuit, execution timing of the cipher processing in the logical circuit, and the logical configurations regarding differences in power consumptions for the cipher processing.

4. The encryption processing device according to claim 1, wherein at least one of the logical configurations is encrypted before being stored in the memory.

5. The encryption processing device according to claim 1, wherein the memory is a nonvolatile memory.

6. The encryption processing device according to claim 1, wherein the logical circuit is constructed by one of FPGA and PLD.

7. The encryption processing device of claim 1, wherein the setting the one plurality of logics modifies power consumption such that communication security is increased over each other available plurality of logics.

8. The encryption processing device of claim 1, wherein the setting the one plurality of logics modifies malfunction analysis such that communication security is increased over each other available plurality of logics.

* * * * *